(12) United States Patent
Shibata et al.

(10) Patent No.: US 7,913,374 B2
(45) Date of Patent: Mar. 29, 2011

(54) PROCESSING METHOD FOR BRAKE ROTOR-EQUIPPED WHEEL BEARING DEVICES

(75) Inventors: Kiyotake Shibata, Shizuoka-ken (JP); Kazunari Yamamoto, Shizuoka-ken (JP); Kazuhisa Shigeoka, Shizuoka-ken (JP); Taku Nishiki, Shizuoka-ken (JP); Kazuo Komori, Shizuoka-ken (JP); Takao Maeda, Shizuoka-ken (JP)

(73) Assignee: NTN Corporation, Osaka-fu (JP)

( * ) Notice: Subject to any disclaimer, the term of this patent is extended or adjusted under 35 U.S.C. 154(b) by 1278 days.

(21) Appl. No.: 11/494,591

(22) Filed: Jul. 28, 2006

(65) Prior Publication Data

US 2007/0033787 A1 Feb. 15, 2007

(30) Foreign Application Priority Data

Aug. 9, 2005 (JP) ................. 2005-231075
Aug. 9, 2005 (JP) ................. 2005-231084

(51) Int. Cl.
*B23P 13/04* (2006.01)
(52) U.S. Cl. ............ 29/557; 29/434; 409/132; 409/143; 451/49; 451/381; 451/385
(58) Field of Classification Search ............ 29/434, 29/557; 409/132, 143; 451/49, 381, 385
See application file for complete search history.

(56) References Cited

U.S. PATENT DOCUMENTS

| | | | |
|---|---|---|---|
| 5,842,388 A | 12/1998 | Visser et al. | |
| 5,899,305 A * | 5/1999 | Austin et al. | 188/218 XL |
| 5,915,502 A * | 6/1999 | Rapisardi et al. | 188/18 R |
| 5,937,499 A * | 8/1999 | Austin et al. | 29/434 |
| 5,983,482 A * | 11/1999 | Kawatani et al. | 29/557 |
| 6,247,219 B1 * | 6/2001 | Austin et al. | 29/434 |
| 6,523,909 B1 | 2/2003 | Nakamura et al. | |
| 2001/0020321 A1 | 9/2001 | Tanio et al. | |
| 2005/0115072 A1 | 6/2005 | Kaneko | |
| 2006/0002644 A1 | 1/2006 | Mitsue et al. | |
| 2006/0110087 A1 | 5/2006 | Igari et al. | |

FOREIGN PATENT DOCUMENTS

| | | |
|---|---|---|
| EP | 1029709 A2 | 8/2000 |
| EP | 1552964 A1 | 7/2005 |
| JP | 10-217001 | 8/1998 |
| JP | 2000-071705 | 3/2000 |

(Continued)

OTHER PUBLICATIONS

European Search Report issued Dec. 28, 2009 in counterpart European Application No. 06254044.8.

(Continued)

*Primary Examiner* — C. J Arbes
(74) *Attorney, Agent, or Firm* — Wenderoth, Lind & Ponack, L.L.P.

(57) ABSTRACT

An outer member and an inner member constituting a wheel bearing device are assembled and the brake rotor is fixed to the hub ring of the inner member. In this state, the pad slide surfaces of the brake rotor are lathed with the reference provided by a wheel pilot end surface. Alternatively, the wheel pilot end surface of the hub ring by chucking the knuckle pilot of the outer member with the wheel bearing device put in its assembled state, and the pad slide surfaces of the brake rotor are lathed with the reference provided by the wheel pilot end surface.

6 Claims, 16 Drawing Sheets

FOREIGN PATENT DOCUMENTS

| | | |
|---|---|---|
| JP | 2000-301401 | 10/2000 |
| JP | 2001-259902 | 9/2001 |
| JP | 2002-18611 | 1/2002 |
| JP | 2002-317834 | 10/2002 |
| JP | 2002-337502 | 11/2002 |
| JP | 2003-214443 | 7/2003 |
| JP | 2004-82320 | 3/2004 |
| WO | 2004/067296 | 8/2004 |

OTHER PUBLICATIONS

Japanese Office Action issued Mar. 18, 2010 in corresponding Japanese Application No. 2005-231084.

* cited by examiner

PROCESSING METHOD FOR BRAKE ROTOR-EQUIPPED WHEEL BEARING DEVICES

BACKGROUND OF THE INVENTION

1. Field of the Invention

This invention relates to a processing method for brake rotor-equipped wheel bearing devices, and more particularly it relates to a method for cutting the pad slide surfaces of a brake rotor.

2. Brief Description of the Prior Art

Wheel bearing devices for automobiles are used for driving wheels and non-driving wheels. At any rate, in wheel bearing devices, the surface runout of the brake surfaces, i.e., the pad slide surfaces, during rotation of the brake rotor, becomes a cause of brake shudder during braking, so that high processing accuracy and high dimensional accuracy are required of the parts of the wheel bearing device. Even if the processing accuracy is increased, however, not only does the processing errors on the parts accumulate during assembly of the wheel bearing device, but also assembling errors are produced, thus making it impossible to suppress the surface runout of the pad slide surfaces of the brake rotor.

To eliminate such drawbacks, there has already been proposed a cutting method (U.S. Pat. No. 6,247,219) wherein a brake rotor-equipped wheel bearing device, assembled in a mounted state, is mounted on a cutting machine and, with the brake rotor-equipped wheel bearing device supported in a mounted state, the pad slide surfaces are cut while rotating the brake rotor.

According to the above-mentioned conventional method, since the pad slide surfaces of the brake rotor are cut with the brake rotor-equipped wheel bearing device put in a mounted state, the accumulated errors produced by the accumulation of the processing errors of the parts, the strains produced during fixing of the brake rotor, and the like are eliminated by cutting. For this reason, the brake rotor-equipped wheel bearing device is restored to its cutting-completed state by assembling the processed brake-equipped wheel bearing device to an actual car. The surface runout of the pad slide surfaces during rotation of the brake rotor is very small, making it possible to rotate the brake rotor with high accuracy.

The conventional processing method for cutting the pad slide surfaces of the brake rotor of a brake rotor-equipped wheel bearing device put in a mounted state is a processing method intended to suppress the surface runout of the pad slide surfaces during rotation of the brake rotor, so as to prevent the occurrence of vibrations during braking. Of the outer and inner members relatively rotating through rolling elements, the outer member is fixed, and in this state the pad slide surfaces of the brake rotor assembled to the inner member are cut. The deformation of the rolling element contact surface during cutting load application causes the runout in the bearing rotation axis and the processing axis, resulting in the corresponding degradation of the surface runout accuracy. Referring to FIG. 9, the inner member 6 is rotated with the outer member 2 of a brake rotor-equipped wheel bearing device 1 being held by a chuck device 4, and the pad slide surfaces 8a and 8b of a brake rotor 8 are lathed with the reference surface defined by the flange surface 2a of the outer member 2. For this reason, the accuracies (axial runout, rigidity, etc.) of the bearing itself influence the processed brake rotor accuracy.

SUMMARY OF THE INVENTION

An object of this invention is to provide a method capable of cutting the pad slide surfaces of the brake rotor of a brake rotor-equipped wheel bearing device efficiently with higher accuracy.

One aspect of the invention resides in providing a method for cutting the pad slide surfaces of the brake rotor of a brake rotor-equipped wheel bearing device which comprises an outer member having a car body attaching flange in the outer periphery and two rows of raceways in the inner periphery, an inner member consisting of a hub ring having a wheel attaching flange in the outer periphery and an inner ring disposed in the small diameter section of the hub ring, two rows of rolling elements interposed between the raceways of the outer and inner members for relatively rotatably supporting the two members, and a brake rotor fixed to the wheel attaching flange of the hub ring, the method being characterized by comprising the steps of lathing, with the hub ring present singly, the wheel pilot end surface of the hub ring with the reference provided by the inner ring abutment surface of the hub ring, assembling the outer and inner members and the rolling elements together, fixing the brake rotor to the hub ring of the inner member, and lathing the pad slide surfaces of the brake rotor with the reference provided by the wheel pilot end surface of the hub ring.

When the pilot end surface of the hub ring is lathed, the reference is defined by the inner ring abutment surface of the hub ring or the raceway of the hub ring. As for a chuck position in lathing the pad slide surfaces of the brake rotor of the hub ring with the reference provided by the wheel pilot end surface of the hub ring, mention may be made of the wheel pilot outer diameter of the hub ring, the wheel pilot inner diameter of the hub ring, the serration hole inner diameter of the hub ring, and the hat section outer diameter of the brake rotor.

Another aspect of this invention resides in a method for cutting the pad slide surfaces of the brake rotor of a brake rotor-equipped wheel bearing device which comprises an outer member having a car body attaching flange in the outer periphery and two rows of raceways in the inner periphery, an inner member consisting of a hub ring having a wheel attaching flange in the outer periphery and an inner ring disposed in the small diameter section of the hub ring, two rows of rolling elements interposed between the raceways of the outer and inner members for relatively rotatably supporting the two members, and a brake rotor fixed to the wheel attaching flange of the hub ring, the method being characterized by comprising the steps of grinding, with the hub ring present singly, the hub ring outer peripheral surface with the reference provided by the wheel pilot end surface of the hub ring, assembling the outer and inner members and the rolling elements together, fixing the brake rotor to the hub ring of the inner member, and lathing the pad slide surfaces of the brake rotor with the reference provided by the wheel pilot end surface of the hub ring.

Still another aspect of this invention resides in providing a method for cutting the pad slide surfaces of the brake rotor of a brake rotor-equipped wheel bearing device which comprises an outer member having a car body attaching flange in the outer periphery and two rows of raceways in the inner periphery, an inner member consisting of (a) a hub ring having a wheel attaching flange in the outer periphery, one row of raceways and a small diameter section and (b) an inner ring disposed in the small diameter section of the hub ring and having one row of raceways, two rows of rolling elements interposed between the raceways of the outer and inner members for relatively rotatably supporting the two members, and a brake rotor fixed to the wheel attaching flange of the hub ring, the method being characterized by comprising the steps of lathing the wheel pilot end surface of the hub ring by chucking the knuckle pilot outer diameter of the outer member with the wheel bearing device put in its assembled state, and lathing the pad slide surfaces of the brake rotor with the reference provided by the wheel pilot end surface of the hub ring.

As for the chuck position in lathing the pad slide surfaces of the brake rotor with the reference provided by the wheel pilot end surface of the hub ring, mention may be made of the wheel pilot inner or outer diameter of the hub ring, the serration inner diameter of the hub ring, and the hat section outer diameter of the brake rotor.

Further, the wheel pilot end surface of the hub ring and the flange surface of the car body attaching flange of the outer member may be clamped together, and so may the wheel pilot end surface of the hub ring and the inboard-side end surface of the outer member.

By lathing the pad slide surfaces of the brake rotor with the reference provided by the wheel pilot end surface of the hub ring, it becomes possible to attain a high accuracy processing which suppresses the surface runout of the pad slide surfaces of the brake rotor without restraining the outer member. To give a concrete example, the surface runout of the pad slide surfaces of the brake rotor can be made not more than 30 μm. Therefore, according to this invention, since the rotation runout of the pad slide surfaces of the brake rotor can be minimized, it is possible to improve the rotation accuracy of the brake rotor put in its mounted state and suppress the occurrence of the brake shudder during braking.

DESCRIPTION OF THE INVENTION

Prior to the explanation of the processing method, a description will be given of a brake rotor-equipped bearing device which is the subject of processing.

Figure 3:
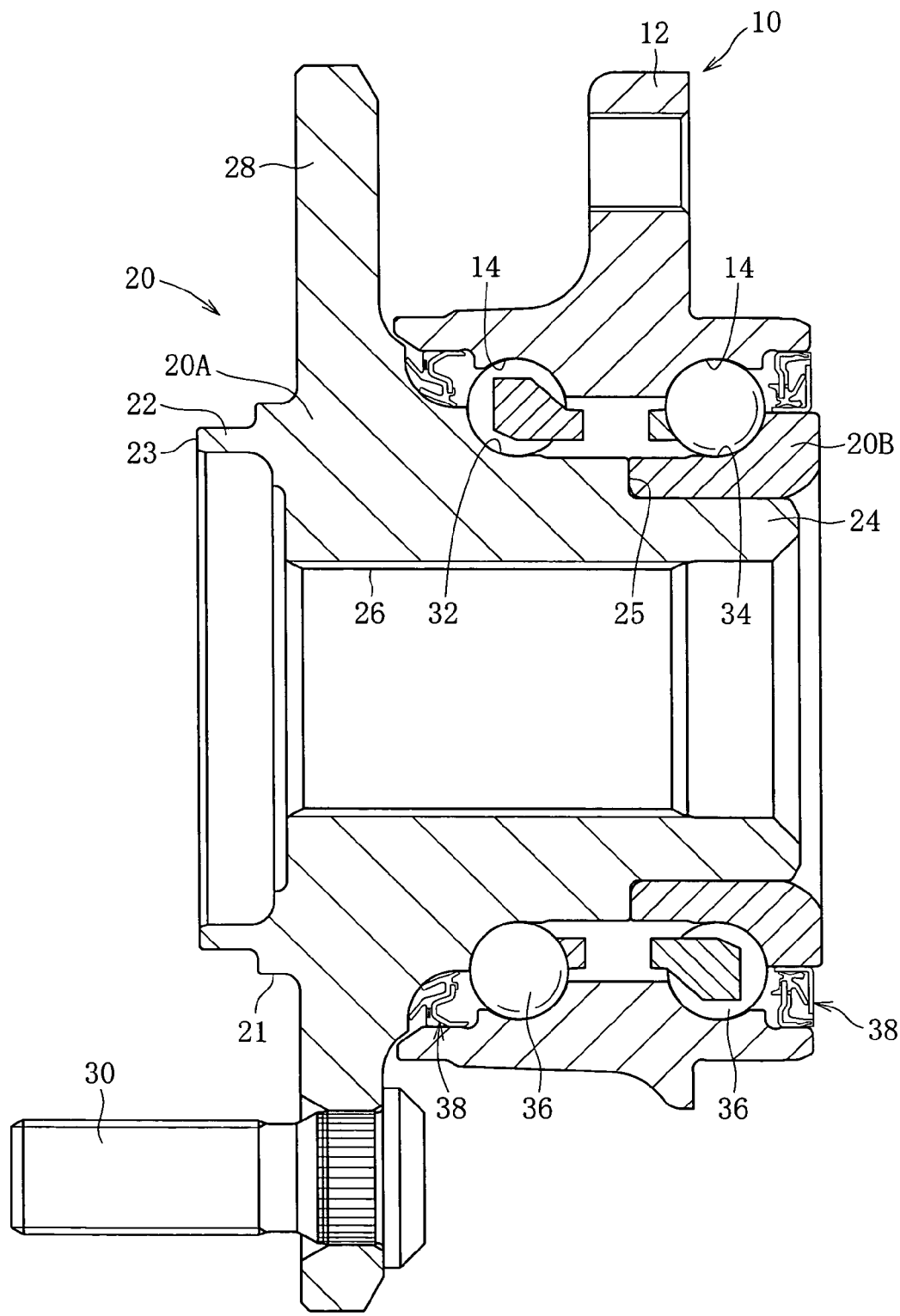
FIG. 3 is a longitudinal sectional view of a wheel bearing device.
Figure 4:
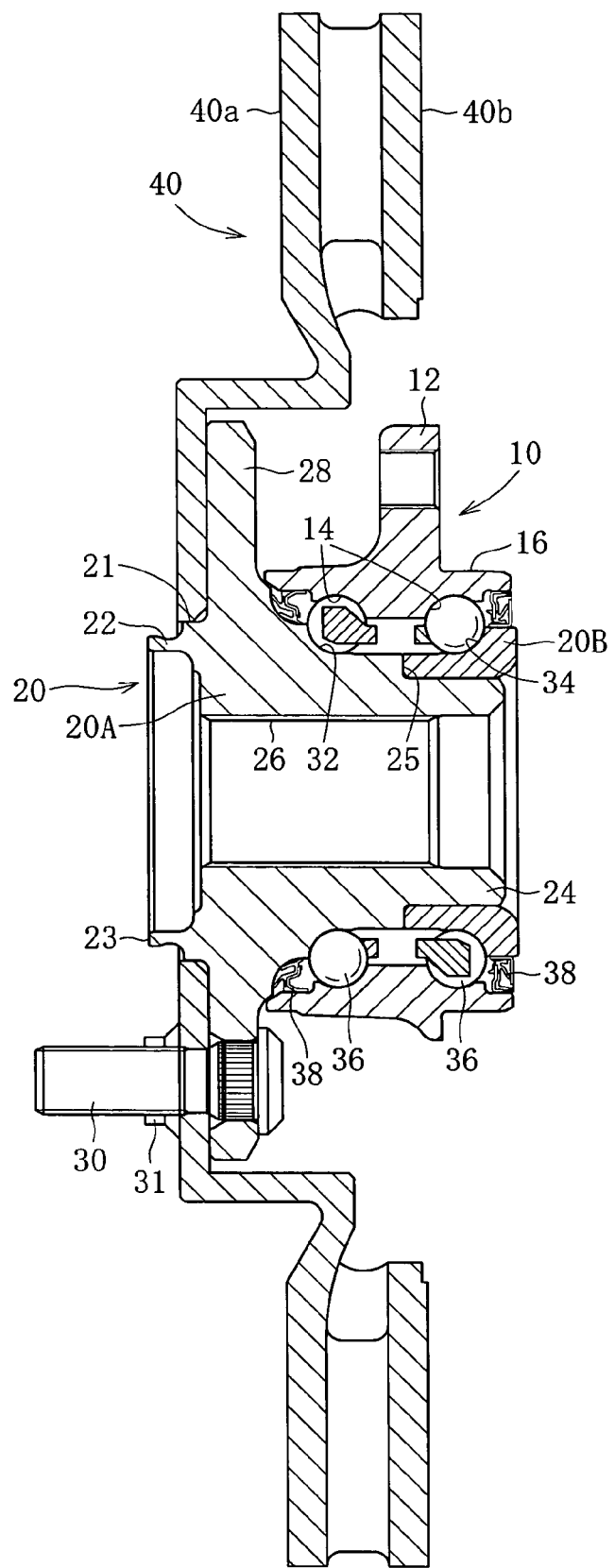
FIG. 4 is a longitudinal sectional view of a brake rotor-equipped wheel bearing device.

An example of a wheel bearing device for driving wheels is shown in FIG. 3, and a brake rotor-equipped wheel bearing device in which the wheel bearing device is integrated with the brake rotor is shown in FIG. 4. This wheel bearing device has as main components an outer member 10 corresponding to a bearing outer ring, an inner member 20 corresponding to a bearing inner ring, and two rows of rolling elements 36 interposed between the outer and inner members 10 and 20.

The outer member 10 is provided in its outer periphery with a flange or car body attaching flange 12, for fixing to a car body, such as a knuckle, and is formed in its inner periphery with two raceways 14. The portion of the outer member 10 indicated by the reference character 16 is a pilot section to be inserted in an attachment hole formed in the knuckle or the like; herein the portion is referred to as the knuckle pilot.

The inner member 20 consists of a hub ring 20A and an inner ring 20B. The hub ring 20A is formed with a wheel pilot 22 at its outboard end appearing in the left-hand side of FIG. 3, and with a small diameter section 24 at its inboard end on the opposite side. The hub ring 20A is centrally formed with an axially extending spline (or serration, thereinafter the same) hole 26. The outer periphery of the outboard end of the hub rig 20A is provided with a flange for attaching a wheel, i.e., a wheel attaching flange 28. The wheel attaching flange 28 has a plurality of hub bolts 30 attached thereto. The intermediate outer periphery of the hub ring 20A is formed with a raceway 32.

The inner ring 20B is disposed on the small diameter section 24 of the hub ring 20A as by a tight fit, with the end surface of the inner ring 20B being abutted against its surface 25 radially rising from the small diameter section 24. In this sense, the surface 25 will be called the inner ring abutment surface. The outer periphery of the inner ring 20B is formed with a raceway 34. The respective raceways 32 and 34 of the hub ring 20A and inner ring 20B correspond to the two raceways 14 of the outer member 10. And, two rows of rolling elements 36 are rollably interposed between the raceway 14 of the outer member 10 and the raceways 32 and 34 of the inner member 20 (the hub ring 20A and inner ring 20B), supporting the outer and inner members 10 and 20 for their relative rotation.

In addition, seals 38 are mounted in the opposite ends between the opposed surfaces of the outer and inner members 10 and 20. The seals 38 prevent foreign matter from entering the bearing, and also prevent leakage of the grease filled in the bearing.

In the wheel bearing device constructed in the manner described above, in assembling it to an actual car, the car body attaching flange 12 of the outer member 10 is attached to the car body. Further, the spline shaft disposed in the outer joint member of the constant velocity joint is inserted in the spline hole 26 in the hub ring 20A. A nut is put in screw engagement with a threaded shaft formed at the front end of the spline shaft to effect tightening with standard torque, axially pressing the hub ring 20A and inner ring 20B, thereby preloading the bearing. Further, a brake rotor 40 and a wheel (not shown) are attached to the hub bolts 30 of the wheel attaching flange 28 and wheel nuts (not shown) are tightened. The wheel is centered by the wheel pilot 22, and so is the brake rotor 40 by a brake pilot 21.

Next, a description will be given of the method for processing the pad slide surfaces 40a and 40b of the brake rotor 40 in the brake rotor-equipped wheel bearing device. The processing method in the first embodiment consists of a first step and a second step. In the first step, with the hub ring 20A present singly, the end surface 23 of the wheel pilot 22 of the hub ring 20A is lathed with the reference provided by the inner ring abutment surface 25. In the second step, with the bearing put in its assembled state, after the brake rotor is attached, the outer diameter of the wheel pilot 22 of the hub ring 20A is chucked, and the pad slide surfaces 40a and 40b of the brake rotor 40 are lathed with the reference provided by the wheel pilot end surface 23.

Figure 1:
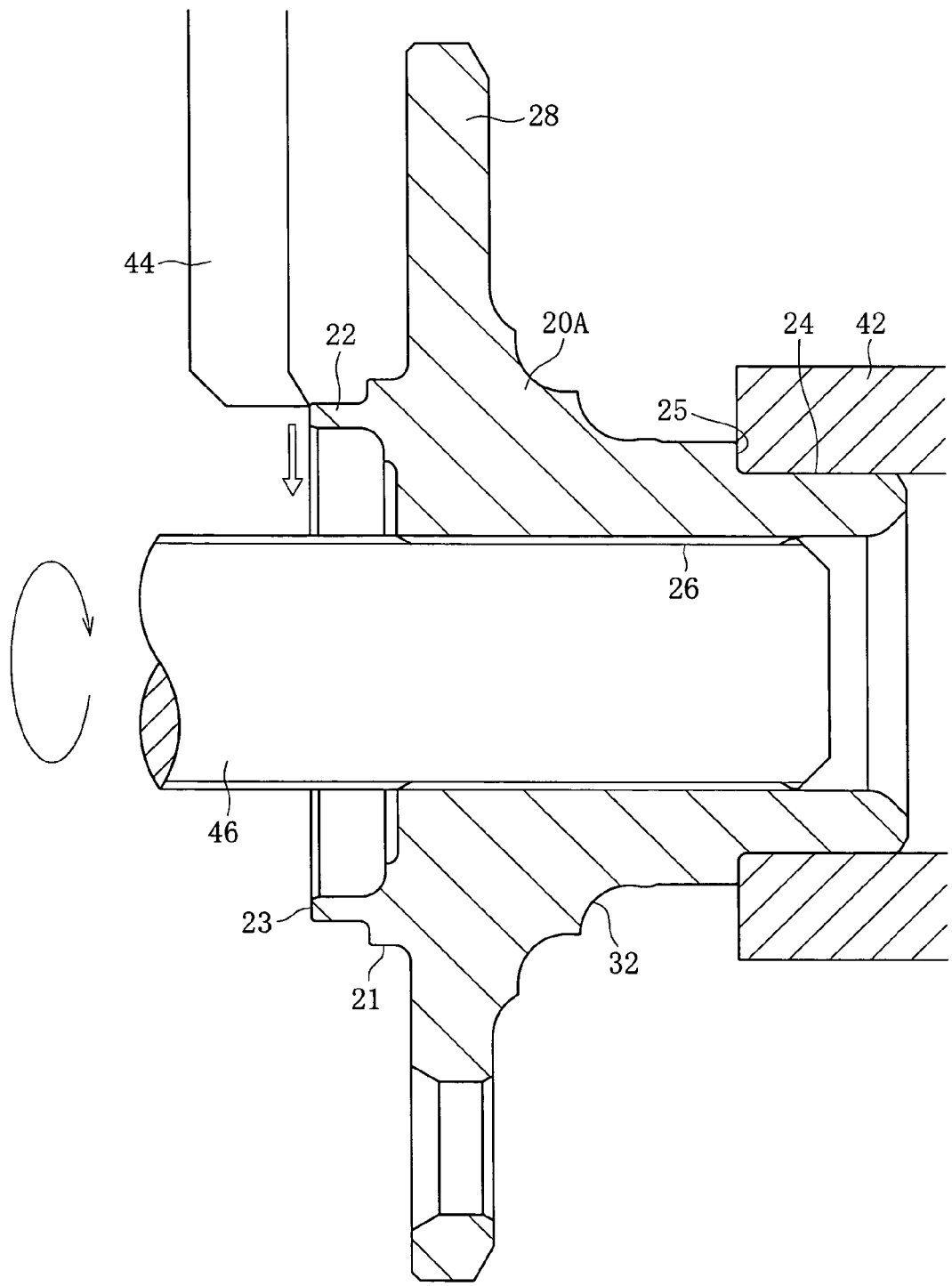
FIG. 1 is a longitudinal sectional view for explaining a first step in a first embodiment of this invention.

The first step will be described with reference to FIG. 1. The hub ring 20A constituting the inner member 20 of the wheel bearing device is held at the small diameter section 24 by a chuck device 42. At this time, the chuck device 42 is abutted against the inner ring abutment surface 25. The spline shaft of a work carry 46 is inserted in the spline hole 26 in the hub ring 20A, and the work carry 46 is rotated as indicated by an arrow, thus imparting a torque so that the hub ring 20A will rotate around the rotation center of the wheel bearing device. And, a turning tool 44 is fed as indicated by an arrow in white to lathe the end surface 23 of the wheel pilot 22 with the reference provided by the inner ring abutment surface 25. Irrespective of dimensional errors or assembly errors in each member, this processing makes it possible to control the axial runout of the end surface 23 of the wheel pilot 22 to a sufficiently small value during rotation of the wheel bearing device.

Figure 2:
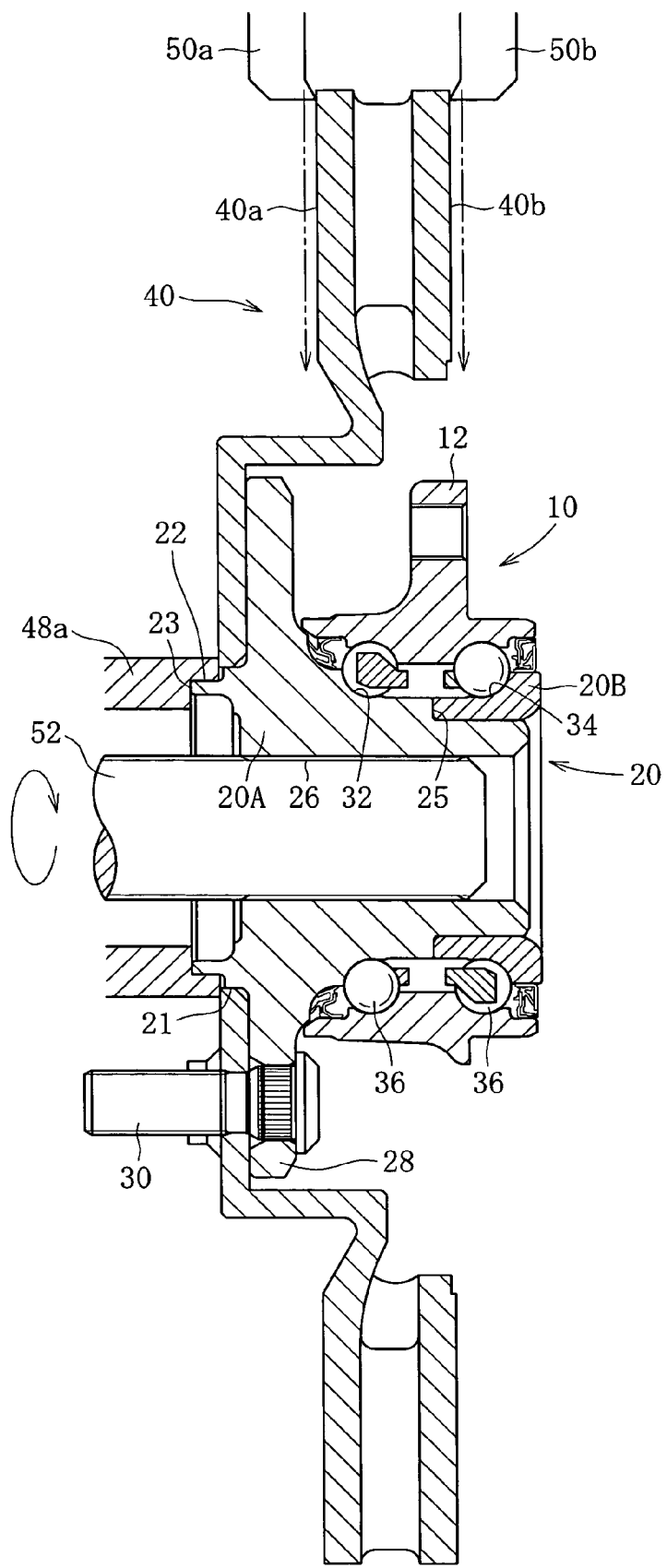
FIG. 2 is a longitudinal sectional view for explaining a second step in the first embodiment of this invention.

The second step will be described with reference to FIG. 2. The brake rotor 40 is attached (FIG. 4) to the hub ring 20A of the wheel bearing device (FIG. 3) having passed through the first step. The thus constructed brake rotor-equipped wheel bearing device, as shown in FIG. 2, is held at the outer diameter of the wheel pilot 22 by the chuck device 48a. At this time, the chuck device 48a is abutted against the end surface 23 of the wheel pilot 22. In this state, the spline shaft of the work carry 52 is inserted in the spline hole 26, and the inner member 20 is rotated while feeding the turning tools 50a and 50b as shown in double-dot dash lines, thereby lathing the pad slide surfaces 40a and 40b of the brake rotor 40.

According to this embodiment, it is possible to secure the end surface 23 of the wheel pilot 22 whose axial surface runout accuracy is made very small with respect to the rotation of the wheel bearing device in the first step, and in the second step, with this used as the reference, the pad slide surfaces 40a and 40b of the brake rotor 40 are lathed, thereby making it possible to minimize the axial surface runout of the pad slide surfaces 40a and 40b of the brake rotor 40 with respect to the rotation of the wheel bearing device.

Further, strains which are produced when the brake rotor 40 is fixed to the wheel attaching flange 28 are removed. Further, in the conventional system, since the slide pad surfaces 40a and 40b of the brake rotor 40 are cut by fixing the outer member 10, runout is produced in the bearing rotation axis and in the processing axis due to deformation of the rolling element contact surface when a cutting load is applied, resulting in a phenomenon in which the surface runout accuracy is degraded by an amount corresponding thereto. In this embodiment, however, since the outer member 10 is not restrained when the pad slide surfaces 40a and 40b of the brake rotor 40 are processed, runout is hardly produced in the bearing rotation axis and the processing axis, so that they can be processed with corresponding accuracy.

Referring to the first step, it has been stated that when the end surface 23 of the wheel pilot 22 of the hub ring 20A which provides the reference is lathed, the inner ring abutment surface 25 is used as the reference. However, the end surface 23 of the wheel pilot 22 may be lathed with the reference provided by the inner ring abutment surface 25.

Figure 5:
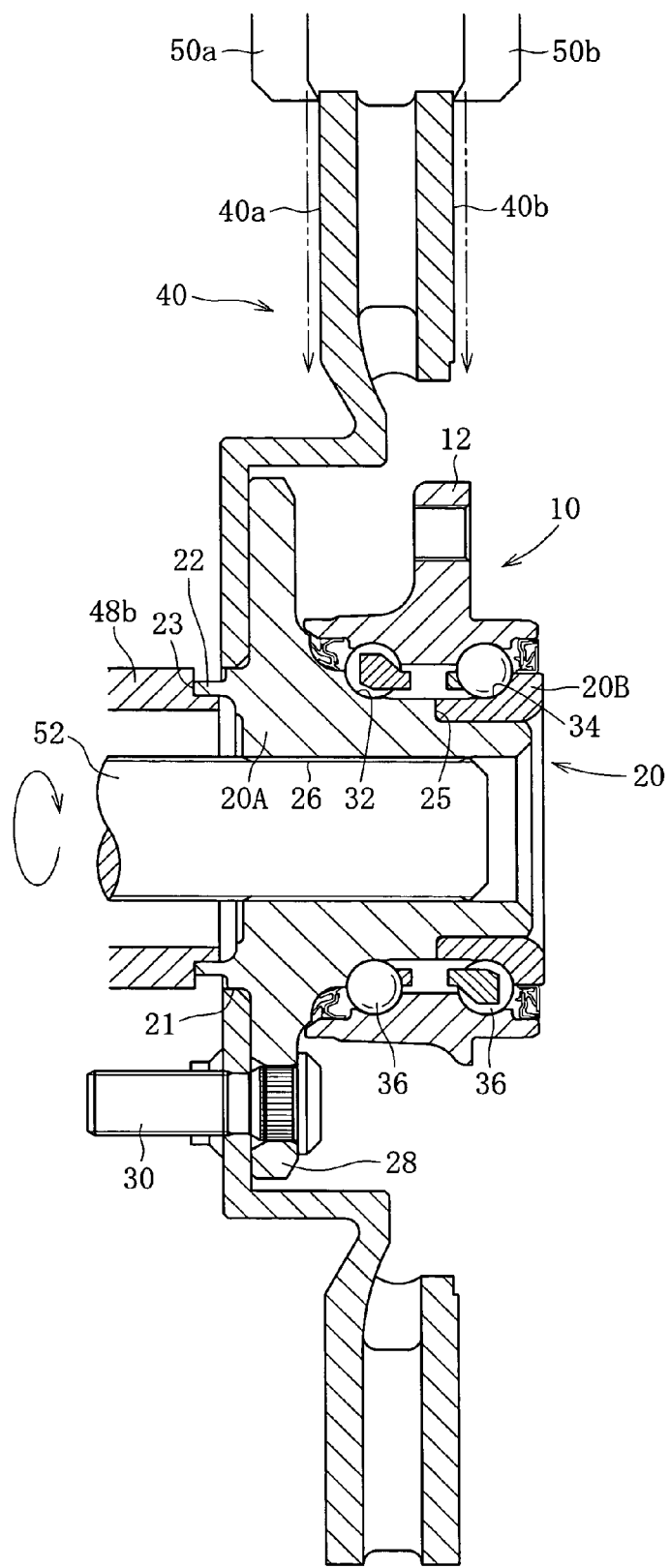
FIG. 5 is a longitudinal sectional view, similar to FIG. 2, showing a modification of the second step.
Figure 6:
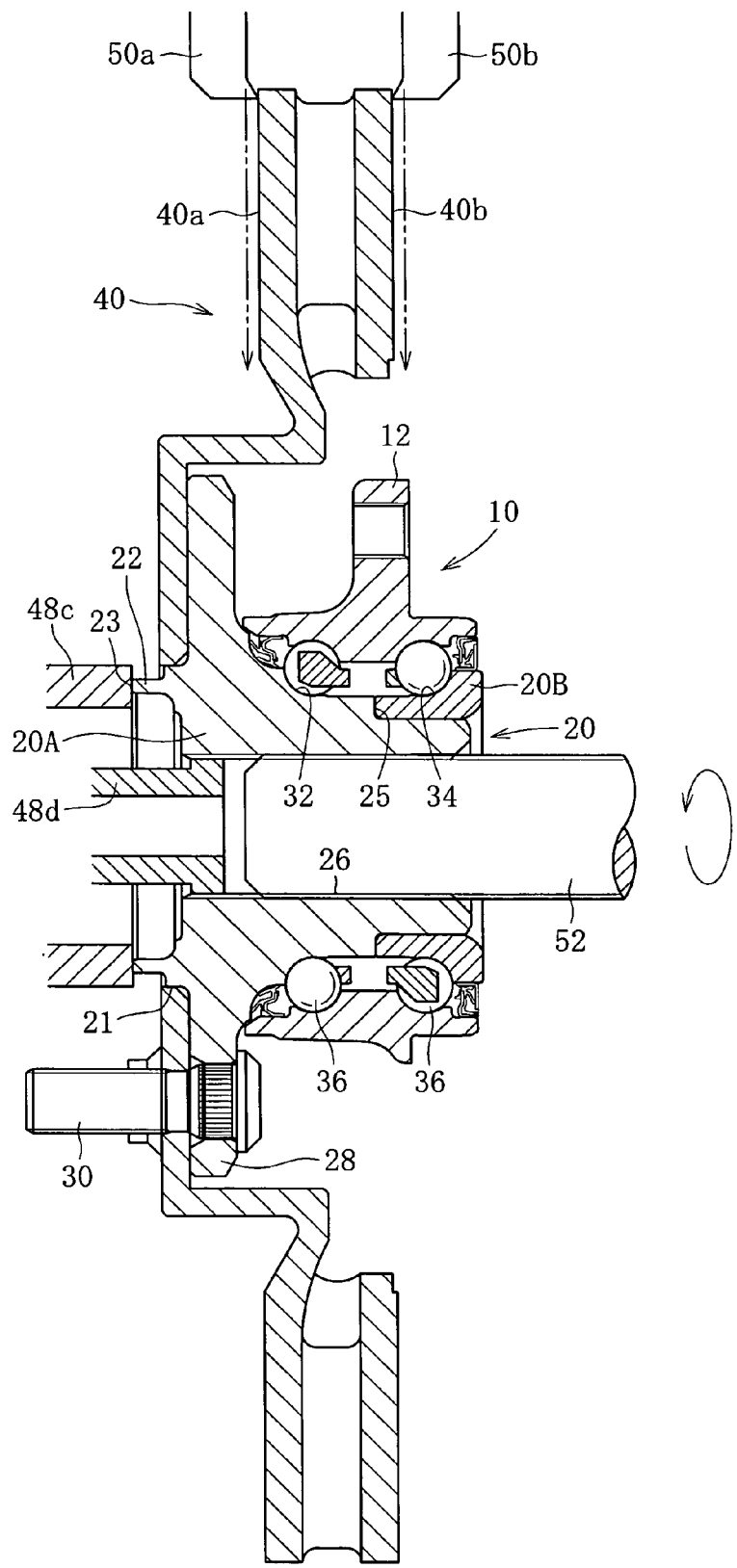
FIG. 6 is a longitudinal sectional view, similar to FIG. 2, showing a modification of the second step.
Figure 7:
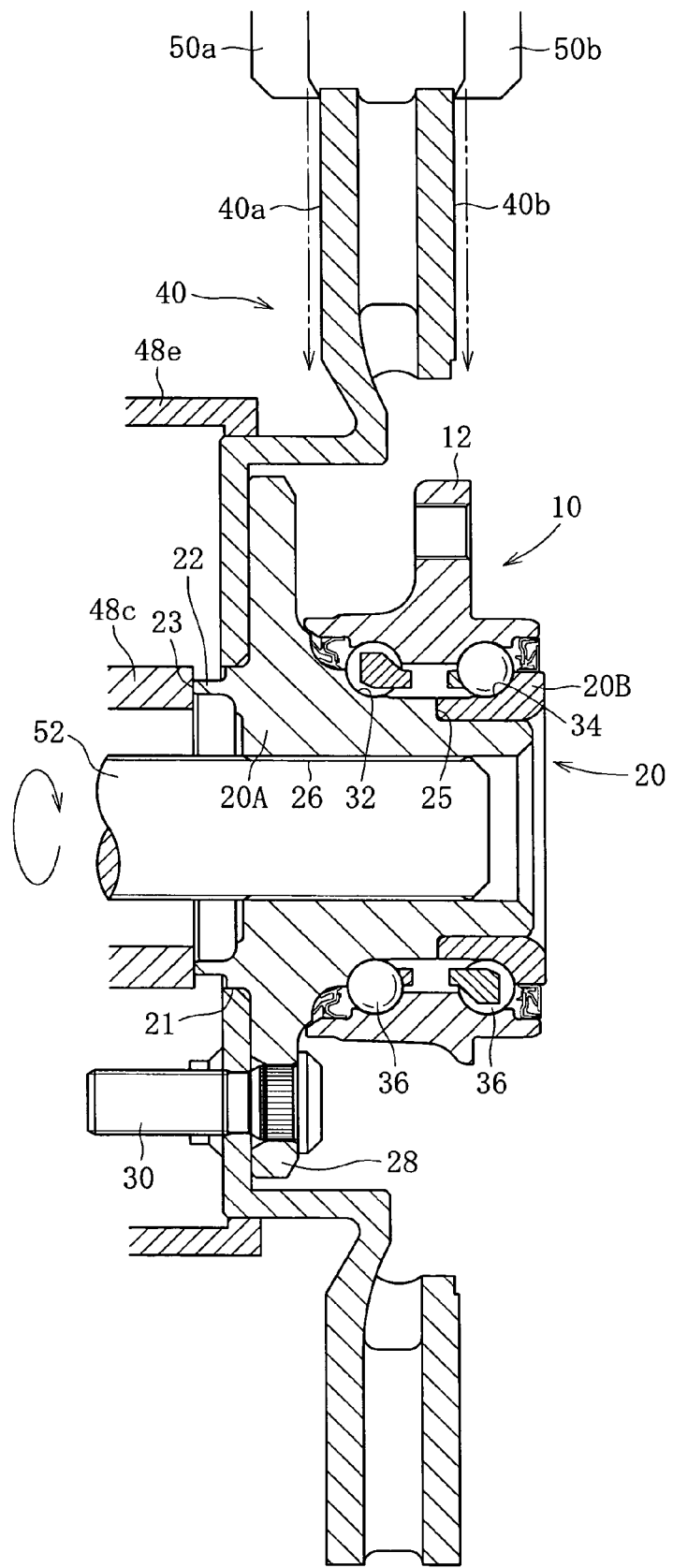
FIG. 7 is a longitudinal sectional view, similar to FIG. 2, showing a modification of the second step.

Further, when the pad slide surfaces 40a and 40b of the brake rotor 40 are lathed in the second step, the hub ring 20A is held at the outer diameter of the wheel pilot 22 by the chuck device 48a; as for the chuck position of the hub ring 20A at this time, however, besides the outer diameter of the wheel pilot 22 as shown in FIG. 2, mention may be made of the inner diameter of the wheel pilot 22 (FIG. 5), the inner diameter of the serration hole 26 (FIG. 6), and the hat section outer diameter of the brake rotor 40 (FIG. 7). More specifically, in FIG. 5, the inner diameter is chucked with the chuck device 48b abutted against the wheel pilot end surface 23. In FIG. 6, with the chuck device 48c abutted against the wheel pilot end surface 23, the inner diameter of the serration hole 26 in the hub ring 20A is chucked by the chuck device 48d. In FIG. 7, with the chuck device 48c abutted against the wheel pilot end surface 23, the hat section outer diameter is chucked by the chuck device 48e.

Figure 8:
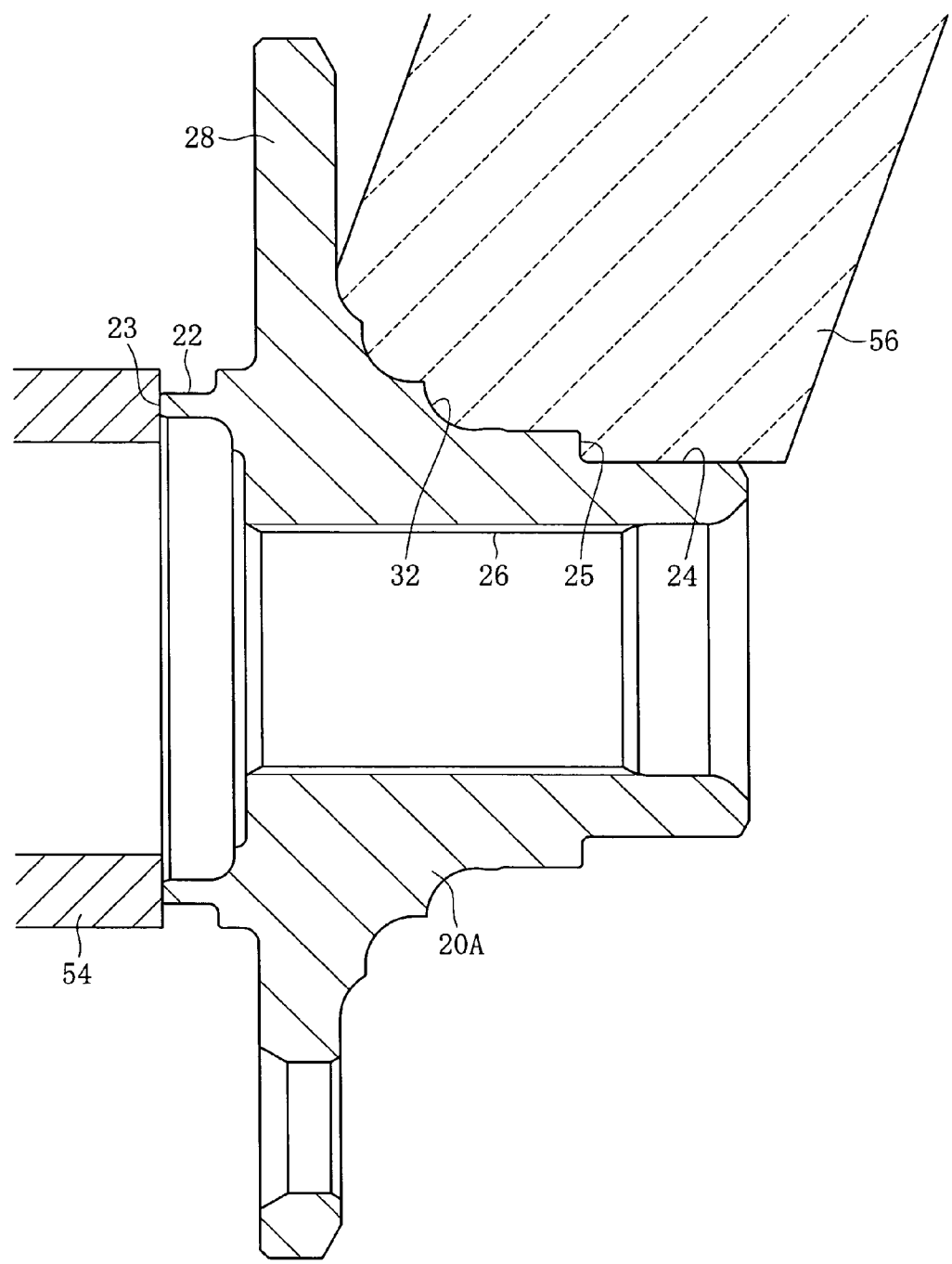
FIG. 8 is a longitudinal sectional view, similar to FIG. 1, for explaining a second embodiment of this invention.
Figure 9:
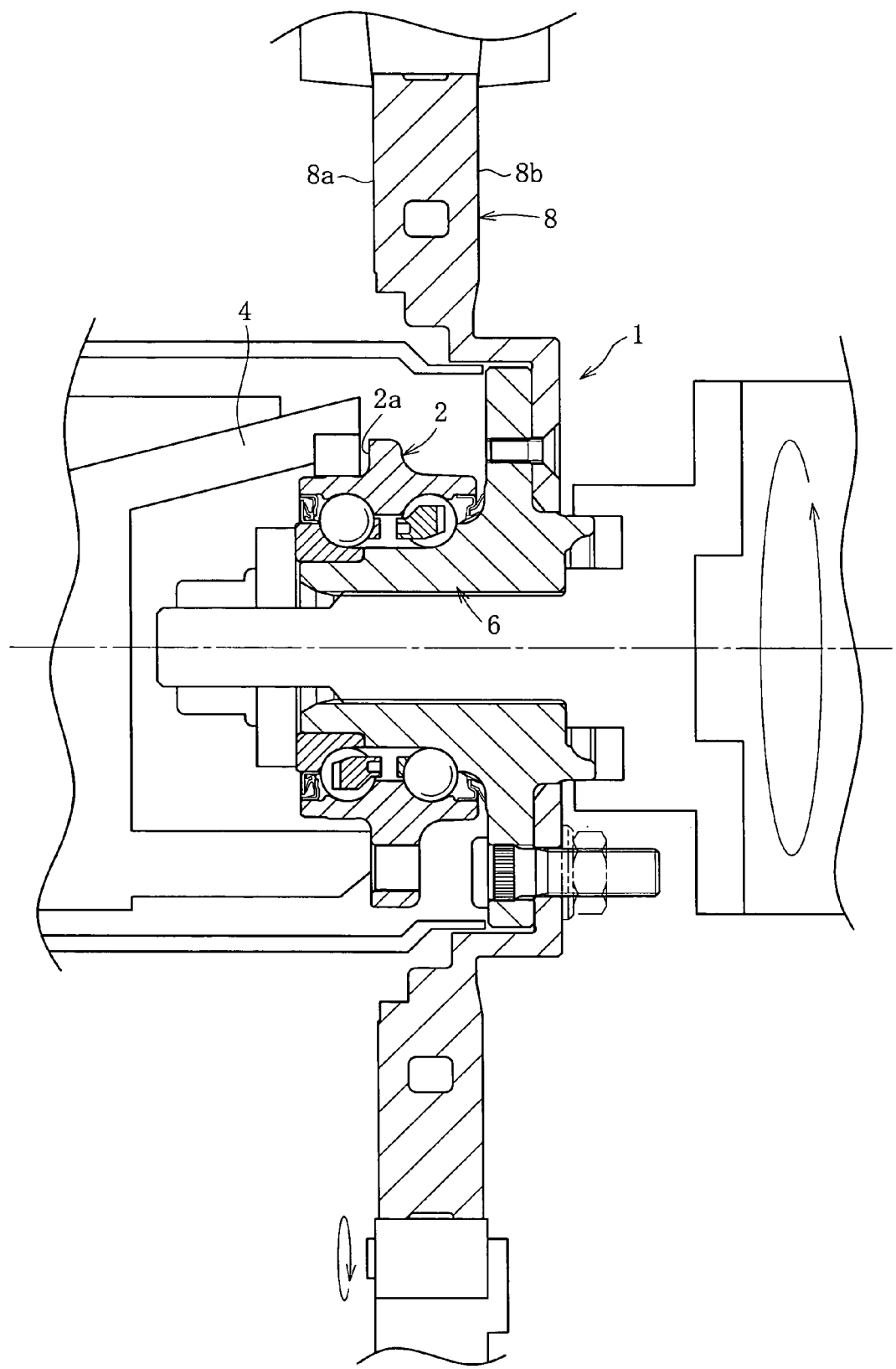
FIG. 9 is a longitudinal sectional view showing the prior art.

The second embodiment is such that, as shown in FIG. 8, with the hub ring 20A present singly, the outer peripheral surface of the hub ring 20A is ground with the reference provided by the end surface 23 of the wheel pilot 22. In this case, the end surface of the wheel pilot 22 is supported by the chuck device 54, and use is made of a formed grinding stone 56 having a contour corresponding to the outer peripheral surface of the hub ring 20A including at least the raceway 32, inner ring abutment surface 25, and small diameter sections 24.

In addition, the wheel bearing device has been described so far by taking as an example one for driving wheels formed with the spline hole 26 in the inner member 20 (hub ring 20A); however, the wheel bearing device may be such that it is used for non-driving wheels and such that the hub ring 20A is solid.

Figure 10:
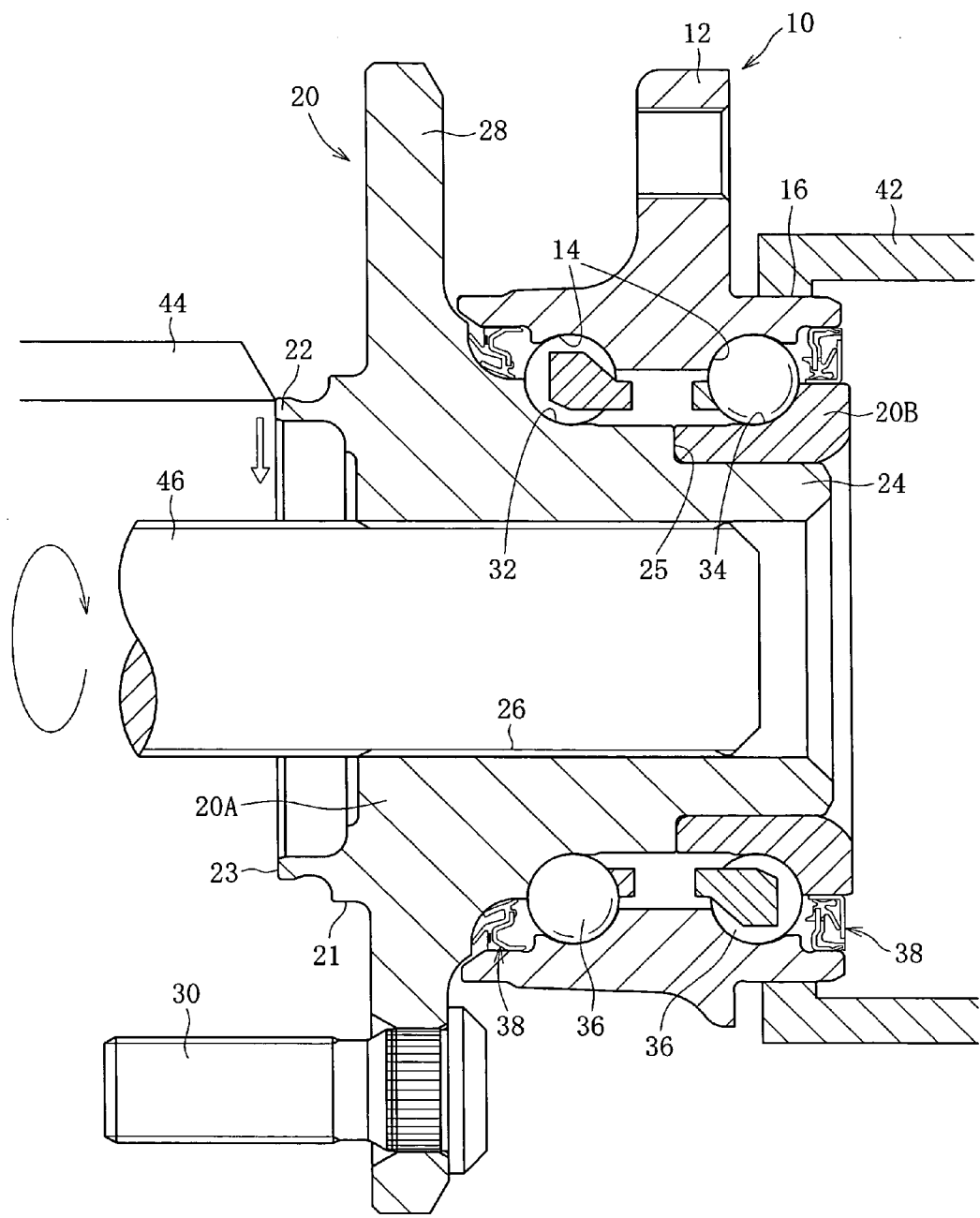
FIG. 10 is a longitudinal sectional view for explaining a first step in a third embodiment of this invention.
Figure 11:
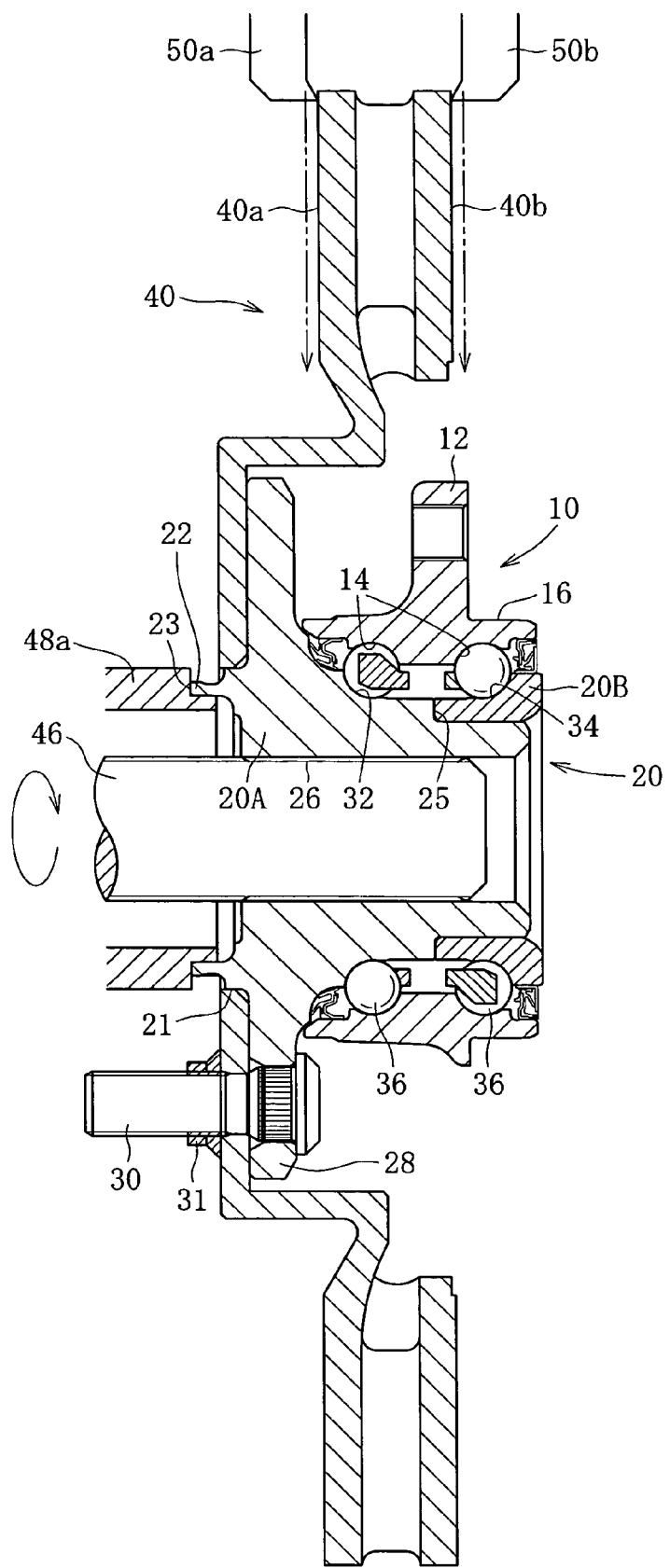
FIG. 11 is a longitudinal sectional view for explaining a second step in the third embodiment of this invention.

Next, the third embodiment of this invention will be described with reference to FIGS. 10 through 16. It consists of a first step and a second step. In the first step, the end surface 23 of the wheel pilot 22 of the hub ring 20A is lathed in a bearing ASSY state (FIG. 10), and in the second step, the pad slide surfaces 40a and 40b of the brake rotor 40 are lathed (FIG. 11).

The first step will be described with reference to FIG. 10. The outer diameter of the knuckle pilot 16 of the outer member 10 of the wheel bearing device is held by the chuck device 42. And, the serration shaft of the work carry 46 is inserted in the serration hole 26 in the hub ring 20A, and the work carry 46 is rotated as indicated by an arrow, thus imparting a torque so that the hub ring 20A will rotate around the rotation center of the wheel bearing device. And, the turning tool 44 is fed as indicated by an arrow in white to lathe the end surface 23 of the wheel pilot 22. Irrespective of dimensional errors or assembly errors in each member, this processing makes it possible to control the axial runout of the end surface 23 of the wheel pilot 22 to a sufficiently small value during rotation of the wheel bearing device.

The second step will be described with reference to FIG. 11. The brake rotor 40 is attached to the hub ring 20A of the wheel bearing device having passed through the first step and is fixed in position by tightening the nuts 31. The thus constructed brake rotor-equipped wheel bearing device, as shown in FIG. 11, is held at the inner diameter of the wheel pilot 22 by the chuck device 48a. At this time, the chuck device 48a is abutted against the end surface 23 of the wheel pilot 22. In this state, the serration shaft of the work carry 46 is inserted in the serration hole 26, and the inner member 20 is rotated while feeding the turning tools 50a and 50b as shown in double-dot dash lines, thereby lathing the pad slide surfaces 40a and 40b of the brake rotor 40.

According to this embodiment, it is possible to secure the end surface 23 of the wheel pilot 22 whose axial surface runout accuracy is made very small with respect to the rotation of the wheel bearing device in the first step, and in the second step, with this used as the reference, the pad slide surfaces 40a and 40b are lathed, thereby making it possible to minimize the axial surface runout of the pad slide surfaces 40a and 40b of the brake rotor 40 with respect to the rotation of the wheel bearing device.

Further, strains which are produced when the brake rotor 40 is fixed to the wheel attaching flange 28 are removed. Further, in the conventional system, since the pad slide surfaces 40a and 40b of the brake rotor 40 are cut by fixing the outer member 10, runout is produced in the bearing rotation axis and in the processing axis due to deformation of the rolling element contact surface when a cutting load is applied, resulting in a phenomenon in which the surface runout accuracy is degraded by an amount corresponding thereto. In this embodiment, however, since the outer member 10 is not restrained when the pad slide surfaces 40a and 40b of the brake rotor 40 are processed, runout is hardly produced in the bearing rotation axis and the processing axis, so that they can be processed with corresponding accuracy.

Figure 12:
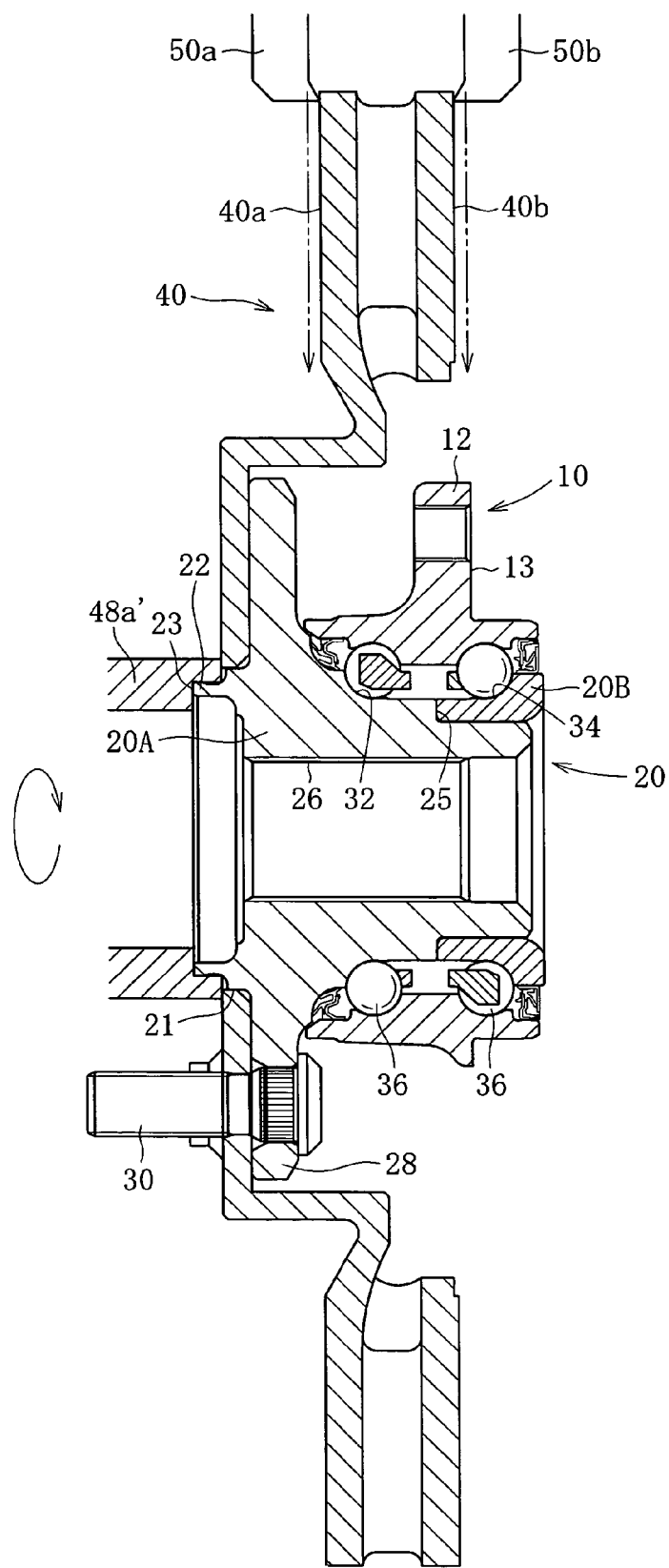
FIG. 12 is a longitudinal sectional view similar to FIG. 11, showing a modification of the second step.
Figure 13:
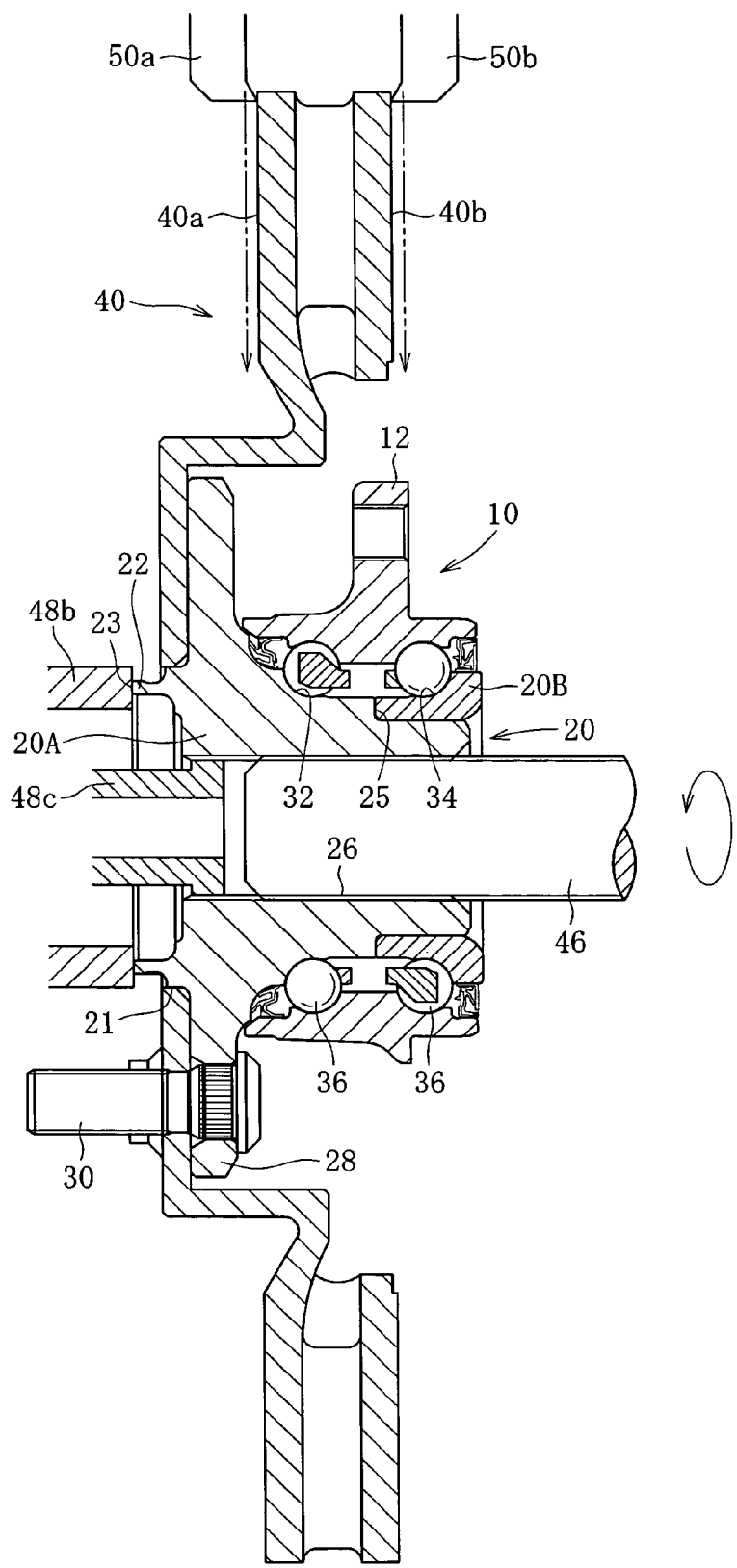
FIG. 13 is a longitudinal sectional view similar to FIG. 11, showing a modification of the second step.
Figure 14:
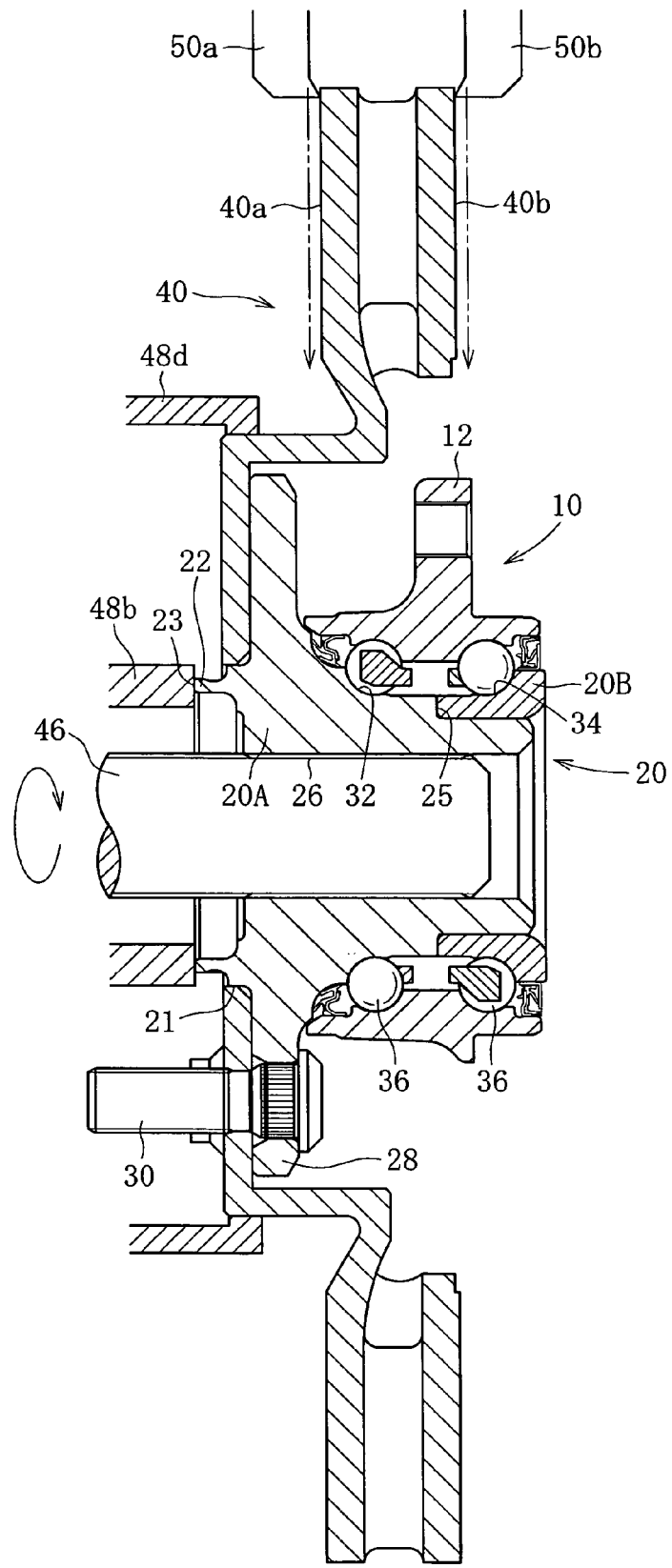
FIG. 14 is a longitudinal sectional view similar to FIG. 11, showing a modification of the second step.

As for the chuck position of the hub ring 20A in lathing the pad slide surfaces 40a and 40b of the brake rotor 40 in the second step, besides the inner diameter of the wheel pilot 22 as described above with reference to FIG. 11, the outer diameter of the wheel pilot 22 may be chucked by a chuck device 48a', as shown in FIG. 12. Alternatively, arrangements as shown in FIGS. 13 and 14 may be employed. In the modification shown in FIG. 13, with the chuck device 48b abutted against the wheel pilot end surface 23, the inner diameter of the serration hole 26 in the hub ring 20A is chucked by the chuck device 48c. In the modification shown in FIG. 14, with the chuck device 48b abutted against the wheel pilot end surface 23, the hat section outer diameter of the brake rotor 40 is chucked by the chuck device 48d.

Figure 15:
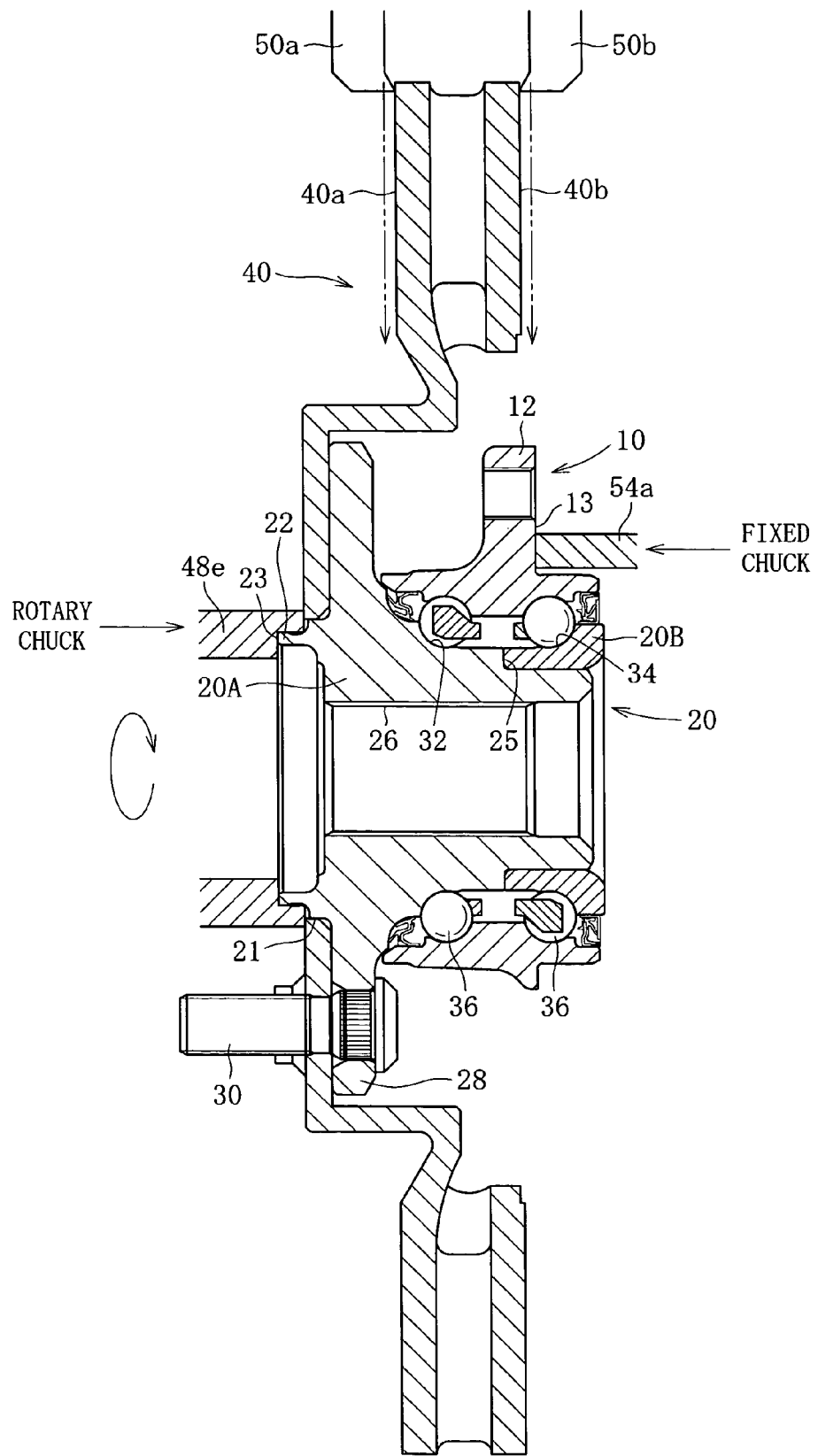
FIG. 15 is a longitudinal sectional view similar to FIG. 11, showing a modification of the second step.
Figure 16:
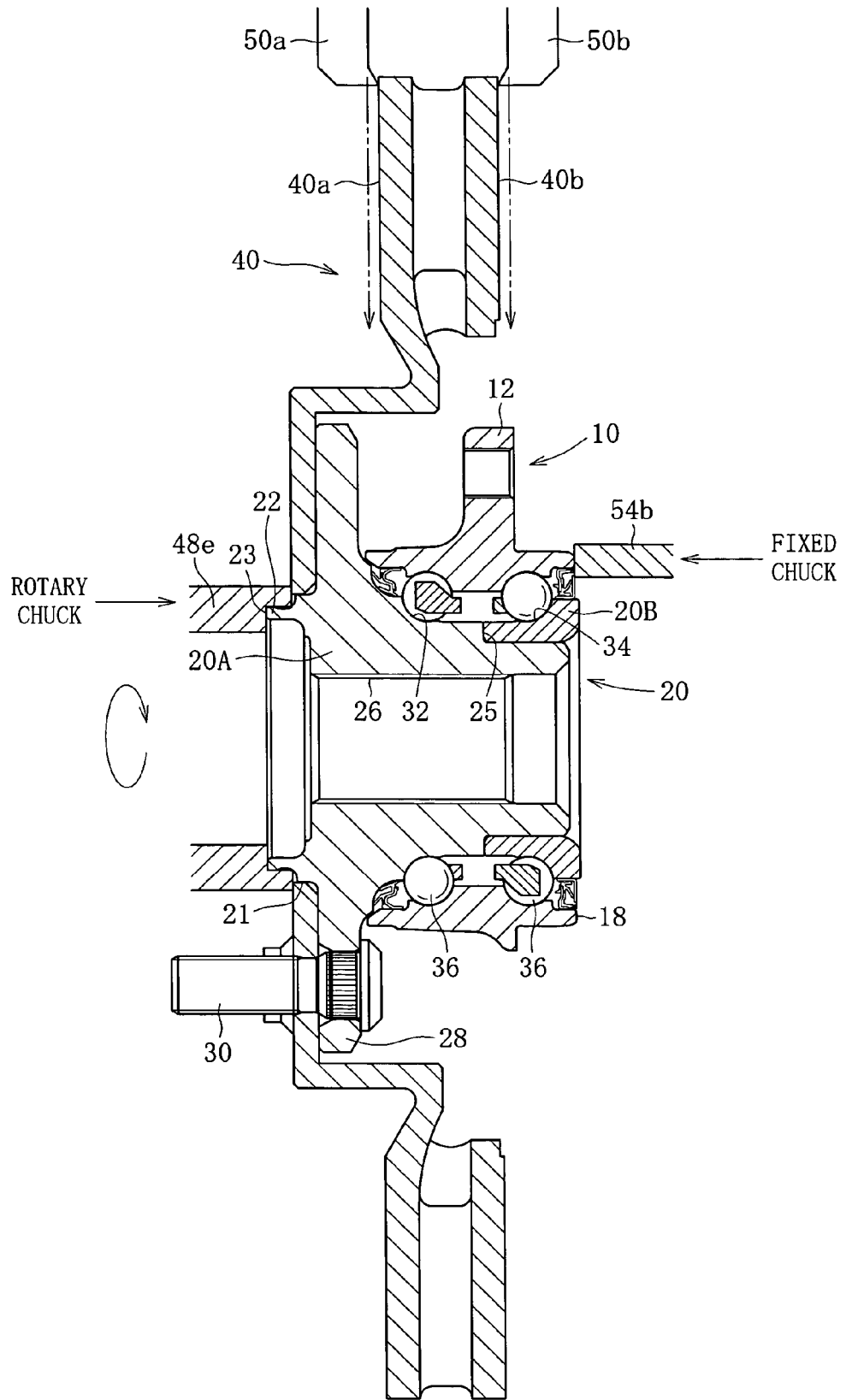
FIG. 16 is a longitudinal sectional view similar to FIG. 11, showing a modification of the second step.

Further, as shown in FIGS. 15 and 16, the clamping may be such that the wheel pilot end surface 23 of the hub ring 20A and the outer member 10 are clamped from axially opposite sides. In each case, the radial movement of the outer member 10 is not restrained, a fact which eliminates the drawbacks of the accuracies (axial runout, rigidity, etc.) of the bearing itself influencing the brake rotor accuracy after processing. In the case of FIG. 15, one rotatable chuck device 48e holds the outer diameter of the wheel pilot 22 of the hub ring 20A while abutting against the wheel pilot end surface 23. The other stationary chuck device 54a is abutted against the flange surface 13 of the car body attaching flange 12 of the outer member 10. In the case of FIG. 16, the rotatable chuck device 48e holds the outer diameter of the wheel pilot 22 of the hub ring 20A while abutting against the wheel pilot end surface 23, and the stationary chuck device 54b is abutted against the inboard-side end surface 18 of the outer member 10.

In addition, the wheel bearing device has been described so far by taking as an example one for driving wheels, formed with the serration hole 26 in the inner member 20 (hub ring 20A); however, the wheel bearing device may be such that it is used for non-driving wheels and such that the hub ring 20A is solid. The chucking of the hub ring in this case may be similar to the chucking described with reference to FIG. 15 or 16. Alternatively, projections may be provided in some places, for example, 3 or 4 places, on the circumference of the wheel pilot inner diameter section of the hub ring in the forging process. Alternatively, a notch may be formed in the wheel pilot end surface, so that a tool may be hooked thereon for turning.

The invention claimed is:

1. A processing method for cutting pad slide surfaces of a brake rotor of a brake rotor-equipped wheel bearing device, the brake rotor-equipped wheel bearing device including an outer member having a car body attaching flange in an outer periphery and two rows of raceways in an inner periphery, an inner member including a hub ring having a wheel attaching flange in an outer periphery, one row of raceways and a small diameter section, an inner ring disposed in the small diameter section of the hub ring and having one row of raceways, two rows of rolling elements, one row of the two rows of rolling elements being interposed between one of the two rows of raceways of the outer member and the one row of raceways of the inner ring and the other row of the two rows of rolling elements interposed between the other of the two rows of raceways of the outer member and the one row of raceways of the hub ring for relatively rotatably supporting the outer member and the hub ring, and a brake rotor fixed to the wheel attaching flange of the hub ring, said processing method comprising:
    lathing a wheel pilot end surface of the hub ring by chucking a knuckle pilot outer diameter of the outer member with the wheel bearing device in an assembled state, and
    lathing the pad slide surfaces of the brake rotor with a reference provided by the wheel pilot end surface of the hub ring.

2. A processing method for brake rotor-equipped wheel bearing devices as set forth in claim 1, wherein when the pad slide surfaces of the brake rotor are lathed, one of an inner and outer diameter of a wheel pilot of the hub ring is chucked.

3. A processing method for brake rotor-equipped wheel bearing devices as set forth in claim 1, wherein when the pad slide surfaces of the brake rotor are lathed, a serration inner diameter of the hub ring is chucked.

4. A processing method for brake rotor-equipped wheel bearing devices as set forth in claim 1, wherein when the pad slide surfaces of the brake rotor are lathed, a hat section outer diameter of the brake rotor is chucked.

5. A processing method for brake rotor-equipped wheel bearing devices as set forth in claim 1, further comprising clamping the wheel pilot end surface of the hub ring and a flange surface of the car body attaching flange of the outer member, when the pad slide surfaces of the brake rotor are lathed.

6. A processing method for brake rotor-equipped wheel bearing devices as set forth in claim 1, further comprising clamping the wheel pilot end surface of the hub ring and an inboard-side end surface of the outer member, when the pad slide surfaces of the brake rotor are lathed.

* * * * *